United States Patent
Krueger et al.

(10) Patent No.: US 10,725,065 B2
(45) Date of Patent: Jul. 28, 2020

(54) ANGLE OF ATTACK SENSOR WITH ROTATABLE AIRFOIL

(71) Applicant: Rosemount Aerospace Inc., Burnsville, MN (US)

(72) Inventors: William B. Krueger, Bloomington, MN (US); Alexander N. Reid, St. Louis Park, MN (US); Richard Alan Schwartz, Faribault, MN (US); Kenneth Freeman, Eagan, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 76 days.

(21) Appl. No.: 15/350,774

(22) Filed: Nov. 14, 2016

(65) Prior Publication Data

US 2018/0136249 A1    May 17, 2018

(51) Int. Cl.
*B64D 45/00* (2006.01)
*G01P 13/02* (2006.01)
*B64D 43/02* (2006.01)
*B64D 15/12* (2006.01)

(52) U.S. Cl.
CPC ............ *G01P 13/025* (2013.01); *B64D 15/12* (2013.01); *B64D 43/02* (2013.01); *B64D 45/00* (2013.01)

(58) Field of Classification Search
None
See application file for complete search history.

(56) References Cited

U.S. PATENT DOCUMENTS 3,882,721 A    5/1975    Neary et al.
4,121,088 A *  10/1978   Doremus ............... B64D 15/16
                                                      219/201
4,435,695 A *   3/1984   Maris .................... B64D 43/02
                                                      244/194
5,257,536 A    11/1993   Beigbeder et al.
6,561,006 B1    5/2003   Roberge et al.
6,813,942 B1*  11/2004   Vozhdaev ............. G01P 13/025
                                                      73/170.02

(Continued)

FOREIGN PATENT DOCUMENTS

EP        0100715 A1     2/1984
EP        3104179 A1    12/2016
WO      WO9961923 A1    12/1999

OTHER PUBLICATIONS

Extended European Search Report for European Patent Application No. 172017220, dated Feb. 19, 2018, 9 pages.

*Primary Examiner* — Jill E Culler
(74) *Attorney, Agent, or Firm* — Kinney & Lange, P.A.

(57) ABSTRACT

An angle of attack sensor includes a vane that is freely rotatable to align with a direction of an oncoming airflow over the vane. The airfoil includes a root proximate a vane hub that connects to a rotatable shaft, a tip opposite the root, a leading edge, a trailing edge opposite the leading edge, a first lateral face, a second lateral face, and a heating element disposed within the airfoil between the first and second lateral faces proximate the leading edge. The first lateral face extends from the leading edge to the trailing edge. The second lateral face is opposite the first lateral face and extends from the leading edge to the trailing edge. The first and second lateral faces are symmetric about a chord of the airfoil and each have an outer surface profile that is nonlinear and geometrically convex from the leading edge to the trailing edge.

18 Claims, 4 Drawing Sheets

(56) References Cited

U.S. PATENT DOCUMENTS

| | | |
|---|---|---|
| 6,901,814 B2 | 6/2005 | Vozhdaev et al. |
| 6,915,687 B2 | 7/2005 | Foster et al. |
| 6,918,294 B1 | 7/2005 | Roberge |
| 7,845,222 B1 | 12/2010 | Goedel et al. |
| 9,239,338 B2 | 1/2016 | Daup et al. |
| 2016/0356175 A1* | 12/2016 | Waddington ............ G01P 5/165 |

* cited by examiner

ANGLE OF ATTACK SENSOR WITH ROTATABLE AIRFOIL

BACKGROUND

The present disclosure relates generally to angle of attack sensors, and more particularly to angle of attack sensors that utilize a rotatable vane.

Modern aircraft often incorporate air data systems that calculate air data outputs based on measured parameters collected from various sensors positioned about the aircraft. For instance, many modern aircraft utilize angle of attack sensors having a rotatable vane that is utilized to determine the aircraft angle of attack (i.e., an angle between oncoming airflow or relative wind and a reference line of the aircraft, such as a chord of a wing of the aircraft). The angle of attack sensor is mounted to the aircraft such that the rotatable vane is exposed to oncoming airflow about the aircraft exterior. Aerodynamic forces acting on the rotatable vane cause the vane to align with the direction of the oncoming airflow (i.e., along a chord extending from a leading edge to a trailing edge of the vane). Rotational position of the vane is sensed and utilized to determine the aircraft angle of attack.

Hindrance of the free rotation of the angle of attack vane or interference with aerodynamic characteristics of the vane due to icing conditions can degrade the accuracy of angle of attack determinations derived from the rotational position of the vane. Accordingly, angle of attack sensors utilizing rotatable vanes typically include heating elements to prevent accretion of ice on the vane. Such heating elements, however, may utilize a significant portion of an amount of electrical power allotted to the angle of attack sensor during operation of the aircraft (i.e., an electrical power budget of the angle of attack sensor). Accordingly, the amount of electrical power utilized by the heating elements during anti-icing and/or deicing operations is an important consideration in the design of such angle of attack sensors.

SUMMARY

In one example, an angle of attack sensor includes a housing, a rotatable shaft, a rotary position sensor, and a vane. The rotatable shaft is disposed within the housing. The rotary position sensor is disposed within the housing and senses rotational position of the rotatable shaft. The vane is connected to the rotatable shaft and is configured to freely rotate to align with a direction of an oncoming airflow over the vane. The vane includes a vane hub connected to the rotatable shaft, and an airfoil extending from the vane hub. The airfoil includes a root proximate the vane hub, a tip opposite the root, a leading edge extending from the root to the tip, a trailing edge opposite the leading edge and extending from the root to the tip, a first lateral face, a second lateral face, and a heating element. The first lateral face extends from the leading edge to the trailing edge. The second lateral face is opposite the first lateral face and extends from the leading edge to the trailing edge. The heating element is disposed within the airfoil between the first and second lateral faces proximate the leading edge. The first and second lateral faces are symmetric about a chord of the airfoil and each have an outer surface profile that is nonlinear and geometrically convex from the leading edge to the trailing edge.

In another example, an angle of attack sensor includes a rotatable shaft, a rotary position sensor, and a vane. The rotary position sensor is configured to sense rotational position of the shaft. The vane is connected to the shaft and is freely rotatable to align with a direction of an oncoming airflow over the vane. The vane includes a first lateral face, a second lateral face, and a heating element. The first lateral face extends from a leading edge of the vane to a trailing edge of the vane. The second lateral face is opposite the first lateral face and extends from the leading edge of the vane of the trailing edge of the vane. The heating element is disposed within the airfoil proximate the leading edge. A forward end of the heating element is disposed at a distance from the leading edge of the airfoil that is less than ten percent of a length of a chord of the airfoil. The first and second lateral faces are symmetric about the chord of the airfoil and each have an outer surface profile that is nonlinear and geometrically convex from the leading edge to a trailing edge.

DETAILED DESCRIPTION

As described herein, an angle of attack sensor includes a vane that is configured to freely rotate to align with a direction of an oncoming airflow over the vane. Rotational position of the vane is sensed (via position of a rotatable shaft connected to the vane) and utilized to determine an aircraft angle of attack (i.e., an angle between oncoming airflow or relative wind and a reference line of the aircraft, such as a chord of a wing of the aircraft). The vane includes an airfoil having first and second lateral faces that extend from a leading edge to a trailing edge of the airfoil and are symmetric about a chord of the airfoil (i.e., defining a symmetric airfoil outer surface profile). At least one heating element is disposed within the airfoil between the first and second lateral faces.

A nonlinear and geometrically convex outer profile of the airfoil defined by the first and second lateral faces and the leading edge lowers an amount of heat transferred from the airfoil to a surrounding airflow as well as a collection efficiency of liquid water (i.e., a ratio of an amount of liquid water collected on the surface of the airfoil to an amount of liquid water in an oncoming flow of air) across a larger proportion of the airfoil surface than, e.g., vanes having linear outer surface profiles. Accordingly, an angle of attack sensor utilizing an airfoil having an outer surface profile as described herein can utilize heating elements that are both physically smaller and draw less electrical current during both steady state and transient (e.g., turn-on) operation to provide sufficient heating to the vane for anti-icing and deicing operations than, e.g., heating elements utilized by rotatable vanes having linear outer surface profiles. Moreover, curvature of the outer surface profile adjacent a leading edge of the airfoil enables placement of the heating elements proximate the leading edge of the airfoil where a majority of heat transfer occurs, thereby enabling more effective use of the heat generated by the heating elements. As such, an angle of attack sensor implementing techniques of this disclosure can decrease both the physical size and the electrical current utilized by heating elements during anti-icing and/or deicing operations.

Figure 1A:
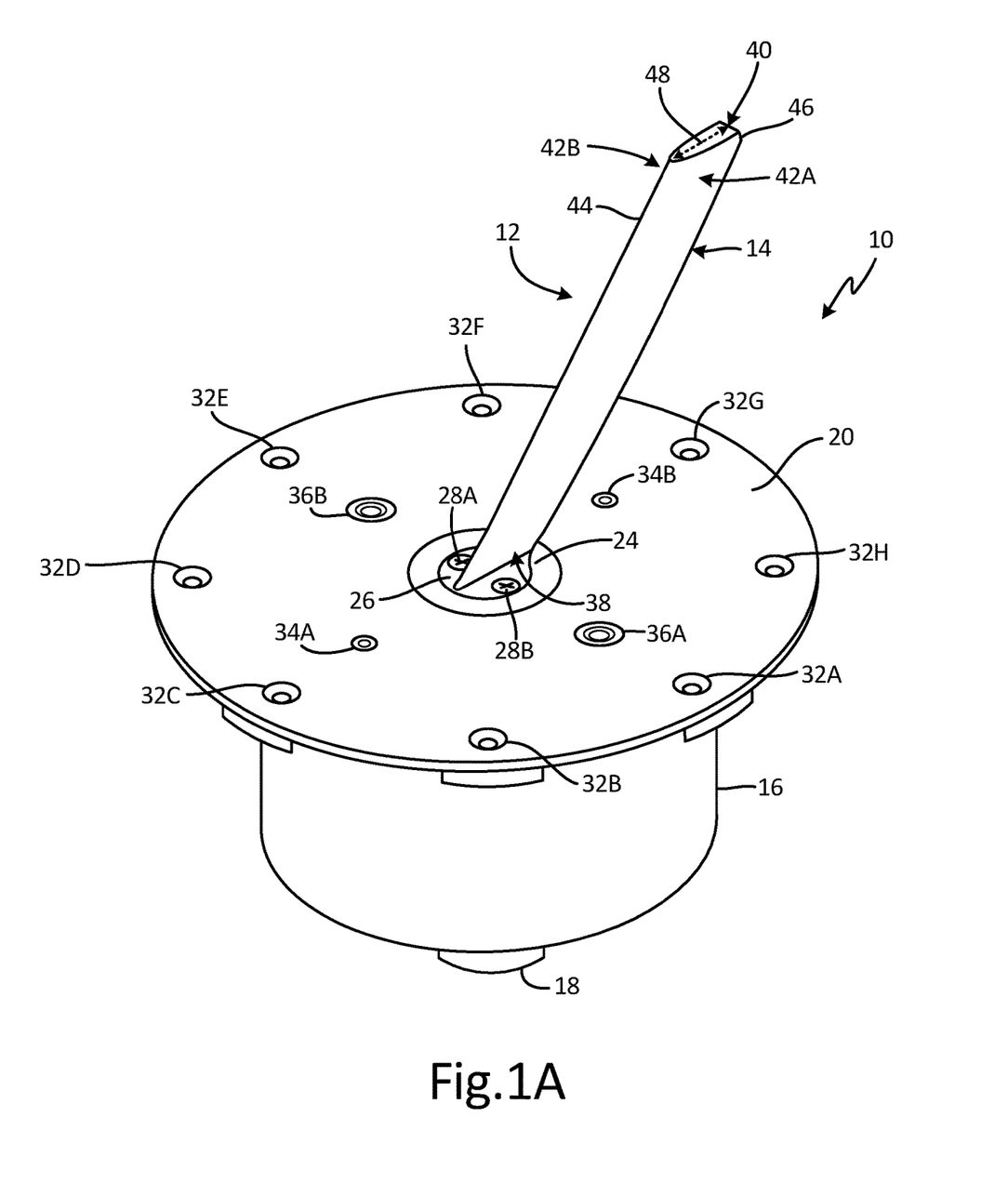
FIG. 1A is a perspective view of an angle of attack sensor that includes a rotatable vane having an airfoil that is configured to freely rotate to align with a direction of an oncoming airflow over the vane.

FIG. 1A is a perspective view of angle of attack sensor 10 that includes rotatable vane 12 having airfoil 14 that is configured to freely rotate to align with a direction of an oncoming airflow. As illustrated in FIG. 1A, angle of attack sensor 10 further includes housing 16, electronics interface connector 18, mounting plate 20, and rotating interface 24. Vane 12 includes airfoil 14 and vane hub 26. Vane hub 26 receives shaft connectors 28A and 28B, which connect vane hub 26 to a rotatable shaft disposed within housing 16, as is further described below. Mounting plate 20 includes aircraft mounting bores 32A, 32B, 32C, 32D, 32E, 32F, 32G, and 32H, as well as alignment bores 34A and 34B and atmospheric vents 36A and 36B. Airfoil 14 includes root 38, tip 40, first lateral face 42A, second lateral face 42B, leading edge 44, trailing edge 46, and chord 48.

Mounting plate 20 is configured to mount angle of attack sensor 10 to an aircraft via mounting bores 32A-32H, such that housing 16 and electronics interface connector 18 extend within an interior of the aircraft and vane 12 (including airfoil 14) extends outside the exterior of the aircraft and is exposed to airflow about the aircraft exterior. Electronics interface connector 18 can be configured to connect with an aircraft communications data bus, such as a data bus configured to communicate via the Aeronautical Radio, Incorporated (ARINC) 429 communications protocol or other communications protocols. In other examples, electronics interface connector 18 carries electrical signals (e.g., analog alternating current voltages) from, e.g., a resolver positioned within housing 16 and configured to sense rotation of a shaft connected to vane 14, as is further described below. In some examples, electronics interface connector 18 carries electrical power to angle of attack sensor 10 for use by heating elements included within vane 14 and/or electrical components included within housing 16. In other examples, angle of attack sensor 10 includes additional connectors (i.e., separate from electronics interface connector 18) configured to carry electrical power and/or additional electrical and/or communicative signals, though additional connectors need not be present in all examples.

As illustrated in FIG. 1A, angle of attack sensor 10 includes alignment bores 34A and 34B. Alignment bores 34A and 34B receive alignment pins that extend through alignment bores 34A and 34B to the exterior of the aircraft to align angle of attack sensor 10 to a predefined mounting orientation.

Rotating interface 24 is positioned adjacent and radially outward from vane hub 16. Rotating interface 24 is connected to a rotatable shaft (illustrated in FIG. 1B) that is disposed within housing 16 via shaft connectors 28A and 28B. That is, vane hub 26 receives shaft connectors 28A and 28B which extend through vane hub 26 and rotating interface 24 to connect both vane hub 26 and rotating interface 24 to the rotatable shaft.

Airfoil 14, as illustrated in FIG. 1A, includes root 38 adjacent vane hub 26. Root 38 of airfoil 14 can be integrally formed with vane hub 26 or otherwise attached to vane hub 26 (e.g., via welding, brazing, or other connection). Airfoil 14 extends along a span of airfoil 14 from root 38 to tip 40, opposite root 38. First lateral face 42A and second lateral face 42B of airfoil 14 each extend from leading edge 44 to trailing edge 46, opposite leading edge 44. First lateral face 42A and second lateral face 42B are symmetric about chord 48 that defines a symmetrical center between first lateral face 42A and second lateral face 42B. First lateral face 42A and second lateral face 42B each have an outer surface profile that is nonlinear and geometrically convex from leading edge 44 to trailing edge 46, as is further described below.

In operation, as air flows over airfoil 14 in a direction from leading edge 44 to trailing edge 46 (i.e., corresponding to forward flight of an aircraft), vane 12 (including airfoil 14 and vane hub 26) rotates such that pressure differences between the air flowing over first lateral face 42A and second lateral face 42B equalize and chord 48 aligns with the direction of the oncoming airflow. A rotatable shaft disposed within housing 16, connected to vane hub 26 via shaft connectors 28A and 28B, rotates with vane 12. Rotational position of the shaft is measured by a rotary position sensor disposed within housing 16 and is utilized for determination of an aircraft angle of attack. One or more heating elements (illustrated in FIGS. 1B and 2) disposed within airfoil 14 between first lateral face 42A and second lateral face 42B provide heat to airfoil 14 for anti-icing and/or deicing operations.

As is further described below, the outer surface profile of each of first lateral face 42A and second lateral face 42B that is both nonlinear and geometrically convex from leading edge 44 to trailing edge 46 causes flow separation and formation of boundary layers of airflow across first lateral face 42A and second lateral face 42B aft of leading edge 44. The boundary layers of airflow, having flow velocities that approach zero, decrease an amount of heat dissipation from first lateral face 42A and second lateral face 42B as compared with other linear surface profiles. Moreover, the flow separation and formation of boundary layers decreases a collection efficiency of liquid water (i.e., the ratio of an amount of liquid water collected on first lateral face 42A and second lateral face 42B to an amount of liquid water in the oncoming flow or air) of first lateral face 42A and second lateral face 42B) as compared with outer surface profiles that do not produce such flow separation. Because the accumulation of liquid water results in increased heat dissipation, the decreased collection efficiency of first lateral face 42A and second lateral face 42B further decreases an amount of heat dissipation from airfoil 14 as compared with outer surface profiles having greater collection efficiency. As such, angle of attack sensor 10 implementing techniques of this disclosure enables heating elements within airfoil 14 to draw less electrical current and to have correspondingly smaller physical size to provide sufficient heat to airfoil 14 for anti-icing and/or deicing operations.

Figure 1B:
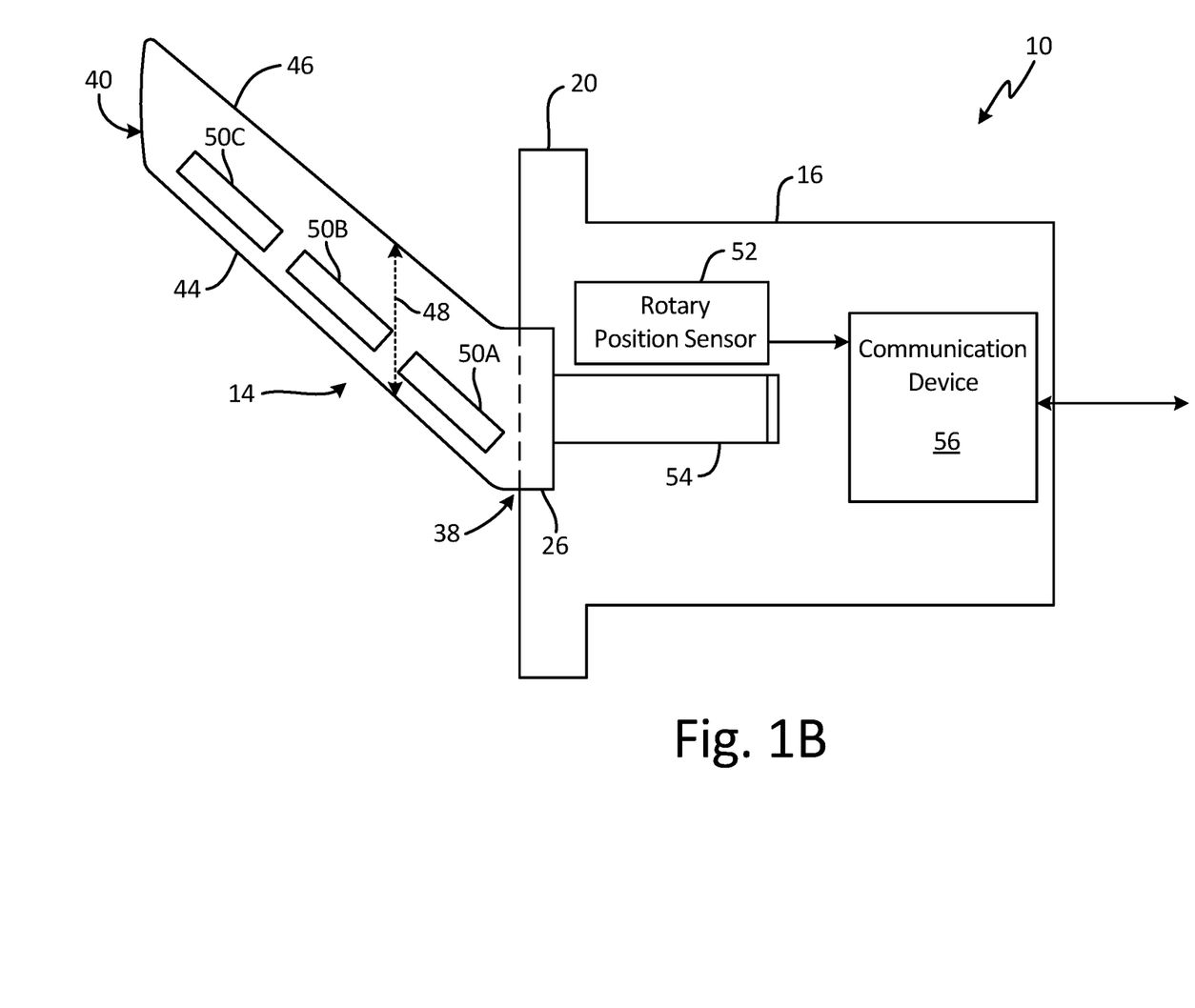
FIG. 1B is a schematic diagram of the angle of attack sensor of FIG. 1A showing heating elements disposed within the airfoil and a rotary position sensor that senses rotational position of a rotatable shaft connected to the vane.

FIG. 1B is a schematic diagram of angle of attack sensor 10 showing heating elements 50A, 50B, and 50C disposed within airfoil 14 and rotary position sensor 52 that senses rotational position of shaft 54 connected to vane hub 26. As further illustrated in FIG. 1B, angle of attack sensor 10 includes electronic communication device 56.

Airfoil 14 extends from root 38 adjacent vane hub 26 to tip 40 opposite root 38. Airfoil 14 includes leading edge 44 and trailing edge 46, opposite leading edge 44. Chord 48 extends in a direction from leading edge 44 to trailing edge 46 and bisects first lateral face 42A and second lateral face 42B (illustrated in FIG. 1A). It should be understood that the example of FIG. 1B is schematic in nature, and a position of heating elements 50A-50C within airfoil 14 is between first lateral face 42A and second lateral face 42B proximate leading edge 44, as is further described below.

Housing 16 extends axially from mounting plate 20 and encloses shaft 54, rotary position sensor 52, and electronic communication device 56. Shaft 54 extends axially from vane hub 26 within housing 16. Shaft 54 is connected to vane hub 26 (e.g., via shaft connectors 28A and 28B illustrated in FIG. 1A) such that rotation of airfoil 14 causes corresponding rotation of shaft 54. Rotary position sensor 52 can be a resolver, encoder, synchro, linear transformer, rotary variable differential transformer (RVDT), potentiometer, or other type of sensor that can sense relative (i.e., incremental) and/or absolute angular position of shaft 54.

Angle of attack sensor 10 can utilize electronic communication device 56 to communicate with external devices via one or more wired or wireless communication networks, or both. For example, electronic communication device 56 can be a network interface card (or equivalent discrete or integrated circuitry) configured to send and receive data over a communications network and/or data bus through electronics interface connector 18 (illustrated in FIG. 1A) according to one or more communications protocols, such as the ARINC 429 communication protocol, controller area network (CAN) bus communication protocol, or other communication protocols. Other examples of electronic communication device(s) 56 can include, e.g., an Ethernet card, an optical transceiver, a radio frequency transceiver, or any other type of device that can send and receive data via wired and/or wireless communications. In some examples, angle of attack sensor 10 routes analog electrical signals (e.g., analog alternating current voltages) from, e.g., a resolver, synchro, linear transformer, rotary variable differential transformer (RVDT), potentiometer, or other rotary position sensor to electronics interface connector 18 for transmission to a consuming system. In such examples, angle of attack sensor 10 need not include electronic communication device 56, but can in some examples.

Housing 16, in some examples, encloses one or more processors and computer-readable memory encoded with instructions that, when executed by the one or more processors, cause angle of attack sensor 10 to operate in accordance with techniques described herein. For example, angle of attack sensor 10 can include one or more processors and computer-readable memory enclosed within housing 16 that enable angle of attack sensor 10 to determine (and output) an angle of attack corresponding to a rotational position of shaft 54 sensed by rotary position sensor 52. Examples of one or more processors can include any one or more of a microprocessor, a controller, a digital signal processor (DSP), an application specific integrated circuit (ASIC), a field-programmable gate array (FPGA), or other equivalent discrete or integrated logic circuitry.

Computer-readable memory of angle of attack sensor 20 can be configured to store information within angle of attack sensor 20 during operation. Computer-readable memory, in some examples, is described as a computer-readable storage medium. In certain examples, a computer-readable storage medium can include a non-transitory medium. The term "non-transitory" can indicate that the storage medium is not embodied in a carrier wave or a propagated signal. In some examples, a non-transitory storage medium can store data that can, over time, change (e.g., in RAM or cache). Computer-readable memory can include volatile memory, non-volatile memory, or both. Examples of volatile memories can include random access memories (RAM), dynamic random access memories (DRAM), static random access memories (SRAM), and other forms of volatile memories. Examples of non-volatile memories can include flash memories, forms of electrically programmable memories (EPROM) or electrically erasable and programmable (EE-PROM) memories, magnetic hard discs, optical discs, floppy discs, or other forms of non-volatile memories.

As illustrated in FIG. 1B, airfoil 14 includes heating elements 50A-50C. Though illustrated as including three separate heating elements (i.e., heating elements 50A-50C), airfoil 14 can include more or fewer than three separate heating elements (e.g., one heating element, two heating elements, or four or more heating elements). For instance, airfoil 14, in certain examples, includes a single heating element disposed within airfoil 14 from a location proximate root 38 to a location proximate tip 40 to provide heat to airfoil 14 during anti-icing and/or deicing operations. Heating elements 50A-50C can be self-regulating heating elements (e.g., self-regulating chip heaters) or heating elements that are controlled via continuous or pulsed electrical current. In some examples, heating elements 50A-50C can be thermostatically controlled to achieve and/or maintain a target temperature. Electrical power for heating elements 50A-50C is provided by a power supply (e.g., within housing 16 or received via an external power source) and routed through, e.g., shaft 54 and between first lateral face 42A and second lateral face 42B to heating elements 50A-50C.

In operation, air flowing over airfoil 14 in a direction from leading edge 44 to trailing edge 46 acts on first lateral face 42A and second lateral face 42B to cause airfoil 14 to rotate such that pressures experience by first lateral face 42A and second lateral face 42B equalize and chord 48 aligns with a direction of the oncoming airflow. Rotation of airfoil 14 causes corresponding rotation of vane hub 26 and shaft 54. Rotary position sensor 52 measures the rotational position (e.g., relative and/or absolute rotational position) of shaft 54 and communicates the measured position signal to an external device, such as an air data computer, stall warning computer, data concentrator unit, aircraft display, or other external device via electronic communication device 56. Heating elements 50A-50C provide heat to airfoil 14 during operation to prevent accretion of ice on airfoil 14. An outer surface profile of each of first lateral face 42A and second lateral face 42B decreases an amount of heat dissipation from airfoil 14, thereby decreasing an amount of electrical current required by heating elements 50A-50C to provide sufficient heat to airfoil 14 for the anti-icing and/or deicing operations.

Figure 2:
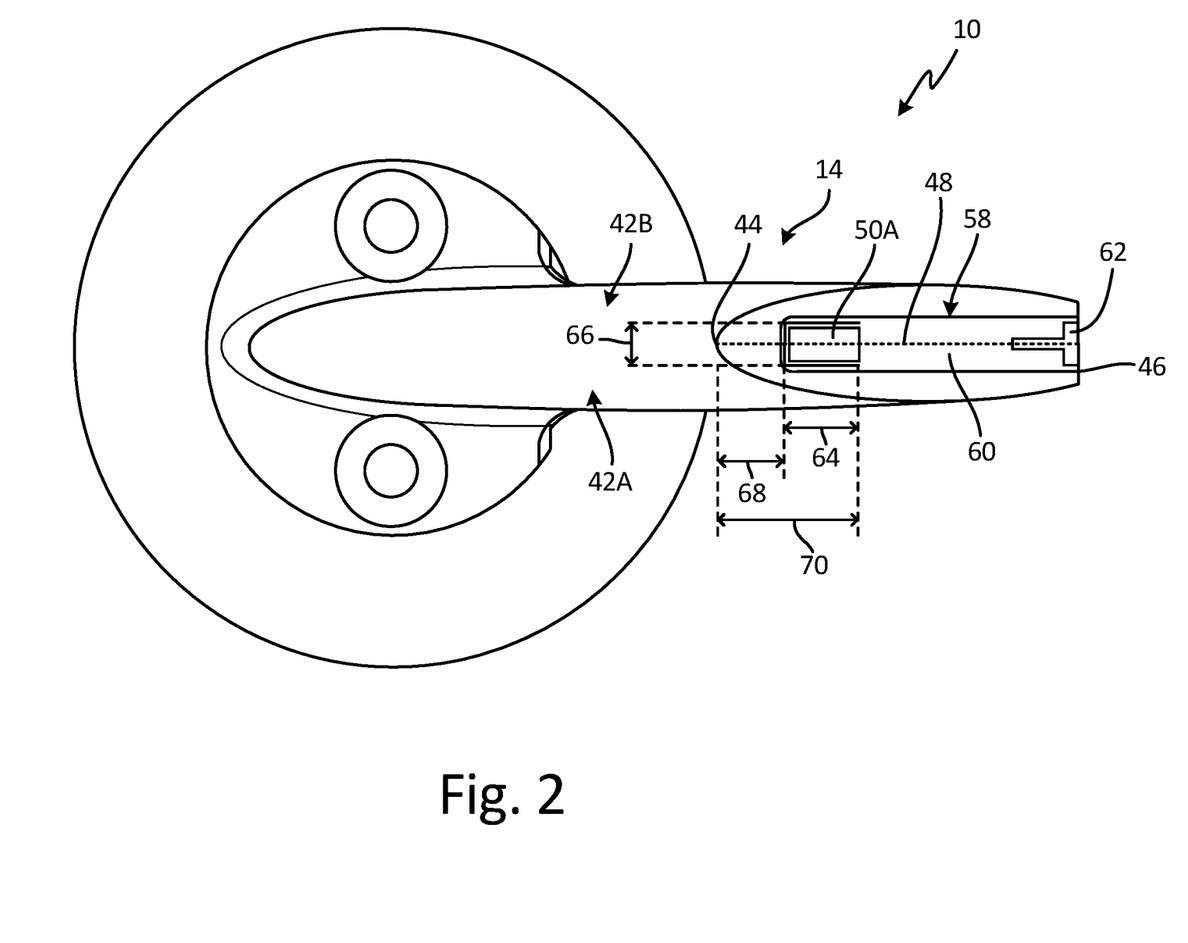
FIG. 2 is a schematic cutaway view of the angle of attack sensor of FIGS. 1A and 1B showing a heating element disposed within the airfoil.

FIG. 2 is a schematic cutaway view of angle of attack sensor 10 showing heating element 50A disposed within airfoil 14. While the example of FIG. 2 is described below with respect to heating element 50A, it should be understood that the techniques described are applicable to any one or more of heating elements 50A, 50B, and 50C.

As illustrated in FIG. 2, heating element 50A is disposed within airfoil 14 between first lateral face 42A and second lateral face 42B. As further illustrated, heating element 50A is included within heater pack 58. Heater pack 58 includes heating element 50A, potting compound 60, and heater pack cap 62. During assembly, heater pack 58 is placed within a cavity of airfoil 14 sized to receive heater pack 58 from trailing edge 46. Potting compound 60 is a thermally conductive potting compound that is inserted within heater pack 58 to fill a space between heating element 52 and heater pack cap 62. While the example of FIG. 2 is described with respect to potting compound 60, it should be understood that other thermally conductive, electrically insulating materials can be utilized. Heater pack cap 62 is inserted at an aft side of heater pack 58 such that the aft side of heater pack cap 62 is flush with trailing edge 46 of airfoil 14. Heater pack cap 62 is bonded (e.g., via welding, brazing, or other bonding technique) to airfoil 14 to seal potting compound 60 within the interior of the cavity of airfoil 14.

As illustrated in FIG. 2, heating element 50A has length 64 along a direction of chord 48 and thickness 66 in a direction perpendicular to chord 48 and extending between first lateral face 42A and second lateral face 42B. In addition, heater pack 58 is positioned within airfoil 14 such that a forward end of heating element 50A is disposed at distance 68 from leading edge 44 and a trailing end of heating element 50A is disposed at distance 70 from leading edge 44.

Distance 68 can be less than ten percent of a length of chord 48 from leading edge 44 to trailing edge 46. In addition, distance 70 can be less than twenty-five percent of the length of chord 48 from leading edge 44 to trailing edge 46. For instance, in one example, a length of chord 48 from leading edge 44 to trailing edge 46 is 1.0 inch (2.54 centimeters), distance 68 is 0.08 inches (0.2032 centimeters), length 64 of heating element 50A is 0.15 inches, and distance 70 is 0.23 inches (0.5842 centimeters). As such, heating element 50A is disposed proximate leading edge 44 where a majority of heat transfer from airfoil 14 to an oncoming airflow occurs. In addition, heating element 50A can extend aft of leading edge 44 less than twenty-five percent of a length of chord 48 from leading edge 44 to trailing edge 46, thereby helping to minimize a size of heating element 50A.

Figure 3:
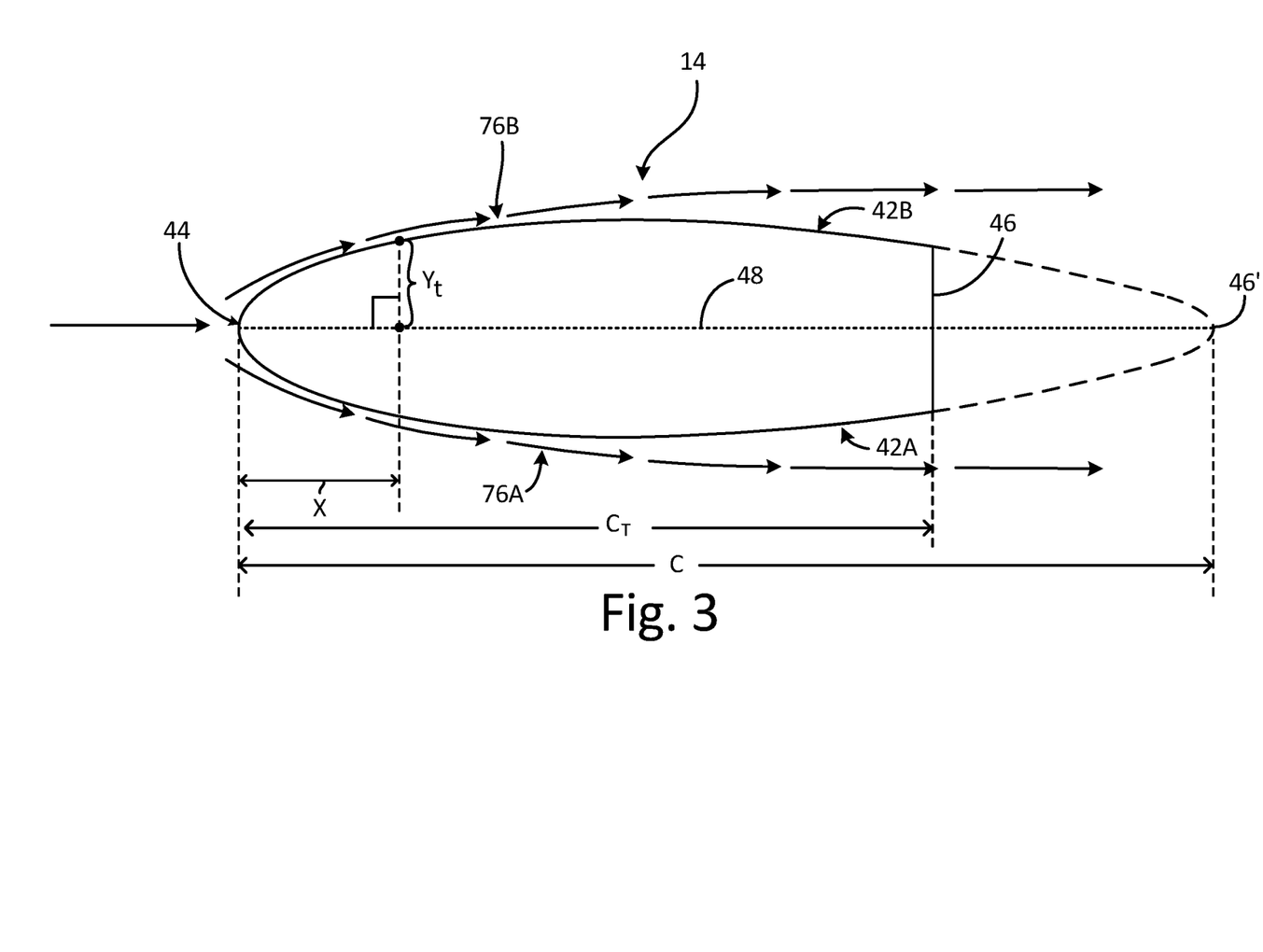
FIG. 3 is a schematic cross-sectional diagram showing an example airflow around lateral faces of the airfoil.

FIG. 3 is a schematic cross-sectional diagram of airfoil 14 showing an example airflow around first lateral face 42A and second lateral face 42B. In the example of FIG. 3, chord length C represents a length of chord 48 extending from leading edge 44 to trailing edge 46'. That is, in some examples, first lateral face 42A and second lateral face 42B can extend from leading edge 44 to trailing edge 46' (i.e., following the illustrated dashed lines from trailing edge 46 to trailing edge 46'). In such examples, airfoil 14 has chord length C representing a length of chord 48 from leading edge 44 to trailing edge 46'. In other examples, such as the example of FIG. 3, airfoil 14 can be truncated at an aft end (e.g., aft of a midpoint along chord 48 between leading edge 44 and trailing edge 46') perpendicular to chord 48. In such examples, first lateral face 42A and second lateral face 42B extend from leading edge 44 to trailing edge 46, and chord 48 has chord length $C_T$.

As illustrated in FIG. 3, each of first lateral face 42A and second lateral face 42B have an outer surface profile that is nonlinear and geometrically convex (i.e., with respect to chord 48) from leading edge 44 to trailing edge 46 (and trailing edge 46'). The outer surface profile of each of first lateral face 42A and second lateral face 42B can be defined by a continuous polynomial of third order or greater (i.e., order greater than two). The polynomial can provide as output, for each location along chord 48, a half-thickness of airfoil 14 as measured from chord 48 to each of first lateral face 42A and second lateral face 42B as a function of an input ratio of the location along chord 48 to chord length C. That is, though in some examples (e.g., the example of FIG. 3), airfoil 14 is truncated at an aft end and has truncated chord length $C_T$, the polynomial expressing the outer surface profile of each of first lateral face 42A and second lateral face 42B can be a function of chord length C representing a length of chord 48 of a non-truncated profile of airfoil 14.

As one example, the polynomial expressing the outer surface profile of each of first lateral face 42A and second lateral face 42B can be expressed by the following equation developed by the National Advisory Committee for Aeronautics (NACA) and commonly referred to as the equation for a symmetrical 4-digit NACA airfoil:

$$y_t = 5tc\left[0.2969\sqrt{\frac{x}{c}} + (-0.1260)\left(\frac{x}{c}\right) + (-0.3516)\left(\frac{x}{c}\right)^2 + 0.2843\left(\frac{x}{c}\right)^3 + (-0.1015)\left(\frac{x}{c}\right)^4\right]$$ (Equation 1)

where $y_t$ is a half-thickness of airfoil 14 as measured from chord 48 to each of first lateral face 42A and second lateral face 42B;

c is chord length C;

t is a selected ratio of a maximum thickness of airfoil 14 (i.e., a maximum distance between first lateral face 42A and second lateral face 42B) to chord length C; and x is a position along chord 48 from a value of zero at leading edge 44 to a value of C at trailing edge 46'.

As indicated above, t in Equation 1 is a selected ratio of a maximum thickness of airfoil 14 to chord length C. The value of t can be selected such that the maximum thickness of airfoil 14 is greater than a thickness of heating elements disposed between first lateral face 42A and second lateral face 42B (e.g., heating elements 50A-50C illustrated in FIGS. 1B and 2). In general, the value of t can be selected such that the maximum thickness and outer surface profile of airfoil 14 defined by first lateral face 42A and second lateral face 42B enable placement of heating elements (e.g., heating elements 50A-50C) between first lateral face 42A and second lateral face 42B proximate leading edge 44, such as within ten percent of chord length $C_T$ (and hence, also chord length C). For instance, as in the example of FIG. 3, t can be selected to have a value of 0.14.

In operation, as airfoil 14 experiences an airflow in a direction from leading edge 44 to trailing edge 46, the air moves over each of first lateral face 42A and second lateral face 42B to a flow separation region aft of leading edge 44 where the airflow separates from first lateral face 42A and second lateral face 42B and forms boundary layers of airflow adjacent first lateral face 42A and second lateral face 42B having flow velocities approaching zero. Locations of flow separation regions of first lateral face 42A and second lateral face 42B change as a function of altitude, angle of attack of the oncoming airflow, and velocity of the oncoming airflow. In addition, flow separation regions of first lateral face 42A and second lateral face 42B can be different. For instance, as illustrated in FIG. 3, as air flows over airfoil 14, the air moves over first lateral face 42A to flow separation region 76A where the airflow separates from first lateral face 42A and forms a boundary layer of airflow having flow velocity approaching zero and extending from flow separation region 76A to trailing edge 46 (or trailing edge 46'). Similarly, air moves over second lateral face 42B to flow separation region 76B where the airflow separates from second lateral face 42B and forms a boundary layer of airflow having flow velocity approaching zero and extending from flow separation region 76B to trailing edge 46 (or trailing edge 46').

The boundary layers of airflow extending from flow separation regions 76A and 76B to trailing edge 46 (or trialing edge 46') and having flow velocities approaching zero dissipate less heat from first lateral surface 42A and second lateral surface 42B than airflow having greater flow velocities (e.g., freestream velocity or greater). In addition, the liquid water present in the separated airflow impinges on first lateral surface 42A and second lateral surface 42B to a lesser degree than attached airflow, thereby decreasing the collection efficiency of liquid water of airfoil 14 aft of flow separation regions 76A and 76B. As such, airfoil 14 having first lateral surface 42A and second lateral surface 42B that are nonlinear and geometrically convex from leading edge to trailing edge decrease both the amount of heat dissipation and collection efficiency of airfoil 14 during operation, thereby decreasing an amount of electrical current utilized by heating elements of airfoil 14 (e.g., heating elements 50A-50C) and a corresponding required size of the heating elements to provide sufficient heat to airfoil 14 during anti-icing and/or deicing operations.

The following are non-exclusive descriptions of possible embodiments of the present invention.

An angle of attack sensor includes a housing, a rotatable shaft, a rotary position sensor, and a vane. The rotatable shaft is disposed within the housing. The rotary position sensor is disposed within the housing and senses rotational position of the rotatable shaft. The vane is connected to the rotatable shaft and is configured to freely rotate to align with a direction of an oncoming airflow over the vane. The vane includes a vane hub connected to the rotatable shaft, and an airfoil extending from the vane hub. The airfoil includes a root proximate the vane hub, a tip opposite the root, a leading edge extending from the root to the tip, a trailing edge opposite the leading edge and extending from the root to the tip, a first lateral face, a second lateral face, and a heating element. The first lateral face extends from the leading edge to the trailing edge. The second lateral face is opposite the first lateral face and extends from the leading edge to the trailing edge. The heating element is disposed within the airfoil between the first and second lateral faces proximate the leading edge. The first and second lateral faces are symmetric about a chord of the airfoil and each have an outer surface profile that is nonlinear and geometrically convex from the leading edge to the trailing edge.

The angle of attack sensor of the preceding paragraph can optionally include, additionally and/or alternatively, any one or more of the following features, configurations, and/or additional components:

Each of the first and second lateral faces can be defined by a continuous polynomial function of third order or greater.

The polynomial function can provide as output a half-thickness of the airfoil as measured from the chord to each of the first and second lateral faces as a function of an input ratio of a given location of the chord to a length of the chord.

The polynomial can be:

$$y_t = 5tc\left[0.2969\sqrt{\frac{x}{c}} + (-0.1260)\left(\frac{x}{c}\right) + (-0.3516)\left(\frac{x}{c}\right)^2 + 0.2843\left(\frac{x}{c}\right)^3 + (-0.1015)\left(\frac{x}{c}\right)^4\right];$$

wherein $y_t$ is a half-thickness of the airfoil as measured from the chord to each of the first and second lateral faces; wherein c is a length of the chord; wherein t is a selected ratio of a maximum thickness of the airfoil between the first lateral face and the second lateral face to the length of the chord; and wherein x is a position along the chord from a value of zero to a value equal to c.

A value of t can be selected such that the maximum thickness of the airfoil between the first lateral face and the second lateral face is greater than a thickness of the heating element.

A length of the heating element extending in a direction along the chord of the airfoil can be less than twenty-five percent of a length of the chord.

A distance between the leading edge of the airfoil and a forward end of the heating element can be less than ten percent of a length of the chord.

The heating element can include a first heating element. The airfoil can further include a second heating element disposed within the airfoil between the first and second lateral faces proximate the leading edge.

The heating element can include a self-regulated chip heater.

The angle of attack sensor can further include a communication device configured to output the rotational position sensed by the rotary position sensor.

The angle of attack sensor can further include an electronics connector exterior to the housing and configured to output an electrical voltage from the rotary position sensor representative of the rotational position of the rotatable shaft.

The airfoil can be truncated at the trailing edge.

The truncation can be perpendicular to the chord of the airfoil.

An angle of attack sensor includes a rotatable shaft, a rotary position sensor, and a vane. The rotary position sensor is configured to sense rotational position of the shaft. The vane is connected to the shaft and is freely rotatable to align with a direction of an oncoming airflow over the vane. The vane includes a first lateral face, a second lateral face, and a heating element. The first lateral face extends from a leading edge of the vane to a trailing edge of the vane. The second lateral face is opposite the first lateral face and extends from the leading edge of the vane of the trailing edge of the vane. The heating element is disposed within the airfoil proximate the leading edge. A forward end of the heating element is disposed at a distance from the leading edge of the airfoil that is less than ten percent of a length of a chord of the airfoil. The first and second lateral faces are symmetric about the chord of the airfoil and each have an outer surface profile that is nonlinear and geometrically convex from the leading edge to a trailing edge.

The angle of attack sensor of the preceding paragraph can optionally include, additionally and/or alternatively, any one or more of the following features, configurations, and/or additional components:

Each of the first and second lateral faces can be defined by a continuous polynomial function of order greater than two.

Each of the first and second lateral faces can be defined by a continuous polynomial function that provides as output a half-thickness of the airfoil as measured from the chord to each of the first and second lateral faces as a function of an input ratio of a given location of the chord to a length of the chord.

Each of the first and second lateral faces can be defined by the polynomial:

$$5tc\left[0.2969\sqrt{\frac{x}{c}} + (-0.1260)\left(\frac{x}{c}\right) + (-0.3516)\left(\frac{x}{c}\right)^2 + 0.2843\left(\frac{x}{c}\right)^3 + (-0.1015)\left(\frac{x}{c}\right)^4\right];$$

wherein $y_t$ is a half-thickness of the airfoil as measured from the chord to each of the first and second lateral faces; wherein c is a length of the chord; wherein t is a selected ratio of a maximum thickness of the airfoil between the first lateral face and the second lateral face to the length of the chord; and wherein x is a position along the chord from a value of zero to a value equal to c.

A value of t can be selected such that the maximum thickness of the airfoil between the first lateral face and the second lateral face is greater than a thickness of the heating element.

The heating element can be disposed within a heater pack that includes a thermally conductive potting compound and a heater pack cap bonded to the trailing edge of the airfoil.

The airfoil can be truncated at the trailing edge perpendicular to the chord of the airfoil.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An angle of attack sensor comprising:
a housing;
a rotatable shaft disposed within the housing;
a rotary position sensor, disposed within the housing, that senses rotational position of the rotatable shaft; and
a vane that is connected to the rotatable shaft and configured to freely rotate to align with a direction of an oncoming airflow over the vane, the vane comprising:
a vane hub connected to the rotatable shaft; and
an airfoil extending from the vane hub and comprising:
a root proximate the vane hub;
a tip opposite the root;
a leading edge extending from the root to the tip;
a trailing edge opposite the leading edge and extending from the root to the tip;
a first lateral face extending from the leading edge to the trailing edge;
a second lateral face, opposite the first lateral face and extending from the leading edge to the trailing edge,
wherein the first and second lateral faces are symmetric about a chord of the airfoil that extends between the leading edge and the trailing edge of the airfoil, wherein each of the first and second lateral faces have an outer surface profile that is nonlinear and geometrically convex from the leading edge to the trailing edge, and
a heating element disposed within the airfoil between the first and second lateral faces and having a forward end and a trailing end, a distance between the forward end and the trailing end being less than twenty-five percent of a length of the chord and the forward end of the heating element being proximate the leading edge of the airfoil;
and wherein a distance from the leading edge of the airfoil to the trailing end of the heating element extending in a direction along the chord of the airfoil is less than twenty-five percent of the length of the chord and a distance between the leading edge of the airfoil and the forward end of the heating element is less than ten percent the length of the chord such that the heating element is located closer to the leading edge than the trailing edge and is located only within a first quarter of the chord where a majority of heat transfer from the airfoil to an oncoming airflow occurs.

2. The angle of attack sensor of claim 1,
wherein each of the first and second lateral faces are defined by a continuous polynomial function of third order or greater.

3. The angle of attack sensor of claim 2,
wherein the polynomial function provides as output a half-thickness of the airfoil as measured from the chord to each of the first and second lateral faces as a function of an input ratio of a given location of the chord to a length of the chord.

4. The angle of attack sensor of claim 2,
wherein the polynomial is:

$$y_t = 5tc\left[0.2969\sqrt{\frac{x}{c}} + (-0.1260)\left(\frac{x}{c}\right) + (-0.3516)\left(\frac{x}{c}\right)^2 + 0.2843\left(\frac{x}{c}\right)^3 + (-0.1015)\left(\frac{x}{c}\right)^4\right];$$

wherein $y_t$ is a half-thickness of the airfoil as measured from the chord to each of the first and second lateral faces;
wherein c is the length of the chord;
wherein t is a selected ratio of a maximum thickness of the airfoil between the first lateral face and the second lateral face to the length of the chord; and
wherein x is a position along the chord from a value of zero to a value equal to c.

5. The angle of attack sensor of claim 4,
wherein t is selected such that the maximum thickness of the airfoil between the first lateral face and the second lateral face is greater than a thickness of the heating element.

6. The angle of attack sensor of claim 1,
wherein the heating element comprises a first heating element; and
wherein the airfoil further comprises a second heating element disposed within the airfoil between the first and second lateral faces proximate the leading edge.

7. The angle of attack sensor of claim 1,
wherein the heating element comprises a self-regulated chip heater.

8. The angle of attack sensor of claim 1, further comprising:
a communication device configured to output the rotational position sensed by the rotary position sensor.

9. The angle of attack sensor of claim 1, further comprising:
an electronics interface connector exterior to the housing configured to output an electrical voltage from the rotary position sensor representative of the rotational position of the rotatable shaft.

10. The angle of attack sensor of claim 1,
wherein the airfoil is truncated at the trailing edge.

11. The angle of attack sensor of claim 10,
wherein the truncation is perpendicular to the chord of the airfoil.

12. An angle of attack sensor comprising:

a rotatable shaft;

a rotary position sensor configured to sense rotational position of the shaft; and a vane, connected to the shaft, that is freely rotatable to align with a direction of an oncoming airflow over the vane, the vane comprising:

a first lateral face extending from a leading edge of the vane to a trailing edge of the vane;

a second lateral face, opposite the first lateral face and extending from the leading edge of the vane to the trailing edge of the vane, wherein the first and second lateral faces are symmetric about a chord of the vane that extends from the leading edge of the vane to the trailing edge of the vane and each have an outer surface profile that is nonlinear and geometrically convex from the leading edge to a trailing edge; and a heating element disposed within the vane and having a forward end and a trailing end, a distance between the forward end and the trailing end being less than twenty-five percent of a length of the chord, the forward end of the heating element being proximate the leading edge of the vane and disposed at a distance from the leading edge of the vane that is less than ten percent of the length of the chord of the vane, wherein a distance between the leading edge of the vane and a trailing end of the heating element extending in a direction along the chord of the vane is less than twenty-five percent of the length of the chord such that the heating element is located closer to the leading edge than the trailing edge and is located only within a first quarter of the chord where a majority of heat transfer from the airfoil to an oncoming airflow occurs.

13. The angle of attack sensor of claim 12, wherein each of the first and second lateral faces are defined by a continuous polynomial function of order greater than two.

14. The angle of attack sensor of claim 13, wherein the vane is truncated at the trailing edge perpendicular to the chord of the vane.

15. The angle of attack sensor of claim 12, wherein each of the first and second lateral faces are defined by a continuous polynomial function that provides as output a half-thickness of the vane as measured from the chord to each of the first and second lateral faces as a function of an input ratio of a given location of the chord to a length of the chord.

16. The angle of attack sensor of claim 12, wherein each of the first and second lateral faces are defined by the polynomial:

$$y_t = 5tc\left[0.2969\sqrt{\frac{x}{c}} + (-0.1260)\left(\frac{x}{c}\right) + (-0.3516)\left(\frac{x}{c}\right)^2 + 0.2843\left(\frac{x}{c}\right)^3 + (-0.1015)\left(\frac{x}{c}\right)^4\right];$$

wherein $y_t$ is a half-thickness of the vane as measured from the chord to each of the first and second lateral faces;

wherein c is the length of the chord;

wherein t is a selected ratio of a maximum thickness of the vane between the first lateral face and the second lateral face to the length of the chord; and wherein x is a position along the chord from a value of zero to a value equal to c.

17. The angle of attack sensor of claim 16, wherein t is selected such that the maximum thickness of the vane between the first lateral face and the second lateral face is greater than a thickness of the heating element.

18. The angle of attack sensor of claim 12, wherein the heating element is disposed within a heater pack that includes a thermally conductive potting compound and a heater pack cap bonded to the trailing edge of the vane.

* * * * *